United States Patent
Massengill et al.

(10) Patent No.: US 7,295,107 B2
(45) Date of Patent: Nov. 13, 2007

(54) FERROMAGNETIC DETECTION PILLAR

(75) Inventors: R. Kemp Massengill, Leucadia, CA (US); Frederick J. Jeffers, Escondido, CA (US); Richard J. McClure, San Diego, CA (US)

(73) Assignee: MedNovus, Inc., Leucadia, CA (US)

( * ) Notice: Subject to any disclaimer, the term of this patent is extended or adjusted under 35 U.S.C. 154(b) by 170 days.

(21) Appl. No.: 11/063,657

(22) Filed: Feb. 22, 2005

(65) Prior Publication Data

US 2006/0158331 A1 Jul. 20, 2006

Related U.S. Application Data

(60) Provisional application No. 60/640,337, filed on Dec. 30, 2004.

(51) Int. Cl.
G08B 1/08 (2006.01)
(52) U.S. Cl. .............. 340/539.12; 340/551; 340/561; 340/565; 340/567; 324/228; 324/260; 324/301
(58) Field of Classification Search ............ 340/539.12, 340/573.1, 551, 561, 565, 540, 541, 568.1, 340/567, 686.1, 686.6; 324/228, 300, 301, 324/307, 309, 207.26, 244, 260; 702/38; 250/287
See application file for complete search history.

(56) References Cited

U.S. PATENT DOCUMENTS

| | | | |
|---|---|---|---|
| 3,781,664 A | 12/1973 | Rorden | |
| 3,971,983 A | 7/1976 | Jaquet | |
| 4,060,039 A | 11/1977 | Lagarrigue | |
| 4,068,164 A | 1/1978 | Schwartz et al. | |
| 4,135,183 A | 1/1979 | Heltemes | |
| 4,193,024 A | 3/1980 | Hoult et al. | |
| 4,734,643 A | 3/1988 | Bubenik et al. | |
| 4,837,489 A | 6/1989 | McFee | |
| 5,039,981 A * | 8/1991 | Rodriguez | 340/551 |
| 5,164,707 A * | 11/1992 | Rasmussen et al. | 340/551 |
| 5,175,419 A | 12/1992 | Yamashita | |
| 5,321,361 A | 6/1994 | Goodman | |
| 5,379,334 A | 1/1995 | Zimmer et al. | |

(Continued)

FOREIGN PATENT DOCUMENTS

WO   WO 03/091753 A1   11/2003

(Continued)

OTHER PUBLICATIONS

ETS-Lindgren Website; *Ferromagnetic Detection System*; May 29, 2004; 2 pages.

(Continued)

*Primary Examiner*—Davetta W. Goins
(74) *Attorney, Agent, or Firm*—Gerald W. Spinks

(57) ABSTRACT

A ferromagnetic detection pillar having one or more applied magnetic field sources and one or more magnetic field sensors, with the magnets and sensors arranged and adapted to detect a ferromagnetic threat object on one side of the pillar. A detection device, such as a motion detector or infrared detector, is also provided, to detect the presence of an object on a selected side of the pillar. A single free-standing pillar can be used, or two or more free-standing pillars can be arranged to constitute a variable aperture detection portal. Single sensors or multiple-sensor configurations can be used.

13 Claims, 10 Drawing Sheets

U.S. PATENT DOCUMENTS

| | | | |
|---|---|---|---|
| 5,397,986 | A | 3/1995 | Conway et al. |
| 5,408,178 | A | 4/1995 | Wikswo, Jr. et al. |
| 5,465,012 | A * | 11/1995 | Dunnam ..................... 307/91 |
| 5,493,517 | A | 2/1996 | Frazier |
| 5,494,033 | A | 2/1996 | Buchanan et al. |
| 5,494,035 | A | 2/1996 | Leuthold et al. |
| 5,504,428 | A | 4/1996 | Johnson |
| 5,610,518 | A | 3/1997 | Chamberlain, IV |
| 5,689,184 | A | 11/1997 | Jeffers et al. |
| 5,705,924 | A | 1/1998 | Jeffers |
| 5,735,278 | A | 4/1998 | Hoult et al. |
| 5,757,183 | A | 5/1998 | Smith et al. |
| 5,842,986 | A | 12/1998 | Avrin |
| 6,064,208 | A | 5/2000 | Steckner |
| 6,087,832 | A | 7/2000 | Doty |
| 6,133,829 | A | 10/2000 | Johnstone et al. |
| 6,150,810 | A | 11/2000 | Roybal |
| 6,208,884 | B1 | 3/2001 | Kumar et al. |
| 6,362,739 | B1 * | 3/2002 | Burton .................... 340/572.6 |
| 6,384,603 | B2 | 5/2002 | Hoult et al. |
| 6,418,335 | B2 | 7/2002 | Avrin et al. |
| 6,541,966 | B1 | 4/2003 | Keene |
| 6,670,809 | B1 | 12/2003 | Edelstein et al. |
| 7,013,245 | B2 * | 3/2006 | Kotter et al. ............... 702/189 |
| 7,113,092 | B2 * | 9/2006 | Keene ........................ 340/551 |
| 7,180,418 | B1 * | 2/2007 | Willms et al. ........... 340/568.1 |
| 2002/0115925 | A1 | 8/2002 | Avrin et al. |
| 2002/0151779 | A1 | 10/2002 | Avrin et al. |
| 2003/0083588 | A1 | 5/2003 | McClure et al. |
| 2003/0171669 | A1 | 9/2003 | Kopp |
| 2003/0216632 | A1 | 11/2003 | McClure et al. |
| 2004/0135687 | A1 | 7/2004 | Keene |
| 2004/0147833 | A1 | 7/2004 | Czipott et al. |
| 2004/0147834 | A1 | 7/2004 | Czipott et al. |
| 2004/0169509 | A1 | 9/2004 | Czipott et al. |
| 2004/0189293 | A1 | 9/2004 | Czipott et al. |
| 2004/0222790 | A1 * | 11/2004 | Karmi et al. ............... 324/300 |

FOREIGN PATENT DOCUMENTS

| | | |
|---|---|---|
| WO | WO 04/044620 A1 | 5/2004 |

OTHER PUBLICATIONS

ETS-Lindgren; *Ferroguard Unveiled at RSNA 2003*; The Quiet Zone; Jan. 2004; p. 11.

Finn, Edward J., et al., *Ferromagnetic Materials in Patients: Detection before MR Imaging*; Radiology; Jul. 1985; vol. 185; pp. 139-141.

Institute for Biodiagnostics; *MRI Safety: Detection of Ferromagnetic Objects*; Date unknown; 8 pages; National Research Council Canada.

Kopp Development; Ferralert Brochure; Date Unknown; 2 pages; Kopp Development; Jensen Beach, FL.

Kotter, David K., et al..; Abstract: *Detection and Classification of Concealed Weapons Using a Magnetometer-based Portal*; NASA ADS Instrumentation Abstract Service; Aug. 2002; 1 page; The International Society for Optical Engineering.

Mednovus/Quantum Magnetics; Safescan Portal 9000 Series Brochure; 1 page, Nov. 30, 2003.

*Melodi Metal Locator Gets Straight to the Point*; Medica 2002; Nov. 2002; 4 pages; Düsseldorf, Germany.

*Metal Detector Finds Lost Coins in Kids*; CNN.com/TECHNOLOGY; Jan. 29, 2003;2 pages; Cable News Network.

Quantum Magnetics; i-Portal 100 Advanced Weapons Detection Portal Brochures; Date unknown; 8 pages.

CMP United Business Media Website; Metal detector guards the door to screen ferromagnetic objects; Diagnostic Imaging SCAN; Jan. 28, 2004; 2 pages.

Weiss, Herbert; *The "Feldplatte" A New Semiconductor Magnetoresistive Device*; IEEE Transactions on Magnetics; Sep. 1966; pp. 540-542; vol. Mag. 2, No. 3.

* cited by examiner

FERROMAGNETIC DETECTION PILLAR

CROSS REFERENCE TO RELATED APPLICATIONS

This application relies upon U.S. Provisional Patent Application No. 60/640,337, filed on Dec. 30, 2004, and entitled "Ferromagnetic Detection Pillar and Variable Aperture Portal."

STATEMENT REGARDING FEDERALLY SPONSORED RESEARCH OR DEVELOPMENT

Not Applicable

BACKGROUND OF THE INVENTION

1. Field of the Invention

This invention is in the field of apparatus used to detect the presence of ferromagnetic threat objects to prevent the objects from being transported into the vicinity of a magnetic resonance imaging (MRI) magnet.

2. Background Art

Large ferromagnetic threat objects can be devastating when subjected to the strong magnetic field of a magnetic resonance imaging magnet. Pipe wrenches, floor scrubbers, oxygen cylinders, and even gurneys have been attracted to the MR magnet, as if propelled by a rocket, with disastrous consequences. At least one tragic death has occurred when a steel oxygen cylinder became, in effect, a lethal weapon. The problem is compounded when one considers the fact that many new MRI magnets have a much higher field of 3.0 Tesla (30 KOe). It is, therefore, prudent to screen people for such objects to prevent possible accidents.

Common metal detector portals, such as those used in airports, detect any metal. Hence they produce many false positive readings arising from coins, etc., that are non-magnetic, and, therefore, present no danger in the MRI setting. Ferromagnetic detection portals are very useful for ferromagnetic threat detection relative to a person or object passed through the portal. Nevertheless, disadvantages are present. First, ferromagnetic detection portals tend to be quite expensive, as these generally contain sensing elements, and other elements, on both sides of the portal, and, thus, these portals may be beyond the budget of some MRI centers.

Second, the side structures of these portals, when taken together, consume a significant surface area. This can be a major problem in a compact MRI center, such as a mobile truck. Indeed, in most mobile trucks, many ferromagnetic portals simply will not fit because of lack of room.

Many portals which are fixed in size are too large, and thus unable to squeeze into the restricted available space. In addition, some portals are designed such that threats trigger an alarm only when the portal is manually turned on. A naive orderly or technician may then simply omit turning on the portal. When the magnet room is entered with the threat object, a disaster can occur.

Placing a ferromagnetic detection system on the door of the magnet room itself is a doubtful proposition at best. By the time the alarm is triggered, the threat is already within the magnet room and, therefore, subject to the large magnetic field and gradient of the MRI magnet. If detection occurs in such a system, it is simply too late.

BRIEF SUMMARY OF THE INVENTION

The preferred embodiment of the present invention is a free-standing ferromagnetic detection column or pillar which is used to screen the desired area, or two or more free-standing pillars can be arranged in the area as appropriate, constituting a variable aperture portal.

The present invention, providing a single ferromagnetic detection pillar, or, alternatively, a variable aperture portal composed of two or more ferromagnetic detection pillars, offers a solution to the space problem encountered in certain MRI centers, such as those incorporated within mobile trucks, or those with small confined areas. A novel aspect of the variable aperture portal is that its aperture can be adjusted at will by the MRI center, giving great flexibility, especially when an MRI center's floor plan is cramped. Hence, the use of two pillars to form a portal of variable aperture offers a significant advantage over a fixed aperture portal.

Another advantage is realized whenever the portal is in one location for a period of time, and then moved to another location of different physical dimensions. When the variable aperture portal is moved, it can be configured with a different aperture than that employed in its original location. Thus, the variable aperture portal formed by two pillars which are not physically connected (free-standing) gives enormous flexibility in the size of the pass-through aperture desired, which can be adjusted depending upon the space requirements of that particular location.

Unlike some ferromagnetic portals, which are ready for ferromagnetic threat detection only when a switch is activated, the present invention is preferably always sensing, and is always in a ready-to-alarm mode. Hence, when a ferromagnetic threat is identified, an alarm is always triggered. The sensitivity may be modified, however, so that nuisance alarms are minimized. Certainly, major threats, such as wrenches, cell phones, floor scrubbers, oxygen tanks, wheelchairs, and gurneys, should be detected.

The preferred embodiment of the pillar of the present invention senses ferromagnetic threat objects, and subsequently triggers an alarm only when a ferromagnetic threat object passes by the designated pass-by zone (referred to as the inside aspect) of the pillar. With this configuration, the pillar does not alarm on ferromagnetic objects passing on the pillar's non-designated sides (i.e., outside the designated pass-by zone). This makes the present invention ideal for a mobile truck MRI imaging facility, wherein the pillar is positioned in close proximity to the wall of the truck, alarming toward the designated inside pass-by zone, but not alarming when ferromagnetic objects pass along the non-designated opposite side of the pillar, that is, the area outside of the wall of the truck.

Consider the example of a mobile truck stationed in a parking lot. When a person (staff member of patient) carrying a ferromagnetic threat object passes by the designated inside zone of the pillar (i.e., within the truck, rather than outside it), a motion-detection system, or heat-sensing system, such as an infra-red sensor system, instructs the sensor system, via an enabling circuit, to alarm.

In contrast, although the sensor system might sense a truck or car, which are both very large, passing by the non-designated outside area of the truck's wall, these do not trigger an alarm, because the pillar is instructed to alarm only when the motion-detection system, or heat-detection system, instructs the pillar that there is someone passing by the designated inside zone of the pillar (which is inside the truck), and not anywhere else.

Granted, there is a small chance that a person not carrying a ferromagnetic threat object is passing by the designated inside zone of the pillar (within the room) and is thereby detected by the motion-detection system, or the heat-sensing system, while, at that exact same moment, a vehicle, which is strongly ferromagnetic, is passing outside the mobile truck's wall. In this instance, a false positive alarm may be registered, since the motion-detection system, or, alternatively, the heat-sensing system, instructs the pillar to alarm if a ferromagnetic threat is, at that moment, sensed. The use of a gradiometer configuration for the sensors lessens this possibility considerably, however. Additionally, appropriate software can be used to decrease the chance of a potential false positive caused by this unique situation. A further mitigating consideration is that it is generally not practical to position MRI trucks next to areas in which high vehicular volume occurs, as the vibration can cause MRI problems, in addition to having patients, and even staff members, literally run over. MRI trucks, as a practical point, then, are stationed in parking lots which do not support continuous traffic. The alarm preferably has both visual components, such as one or more lights, and auditory components.

The present invention preferably is configured with a gradiometer configuration for the sensors, as this decreases threat alarms from distant unwanted sources, such as moving elevators, or cars moving in a parking garage or close to the outside wall of a mobile MRI truck, or ferromagnetic objects moving in the next room to that housing the present invention. In the gradiometer configuration, each sensor receives essentially the same signal from a distant source, and, therefore, no alarm is triggered by distant ferromagnetic threat objects, because of the absence of a differential, from one sensor to the other, in the received magnetization signal.

Alternatively, a single sensor configuration can be used. In fact, this configuration has the advantage of better sensing capability than a gradiometer configuration, with the disadvantage that more distant ferromagnetic threats are detected. In the MRI center which does not have extraneous distant sources of ferromagnetic material which trigger unwanted false alarms, such as caused by moving elevators or vehicles in close proximity, the single sensor is actually preferable because it achieves better detectability. For a non-mobile MRI center with virtually no ferromagnetic "noise" outside the room housing the present invention, a single sensor configuration can be employed. For a mobile truck installation, with varying circumstances from one place to another, it is generally appropriate to employ a gradiometer sensor configuration, however.

The novel features of this invention, as well as the invention itself, will be best understood from the attached drawings, taken along with the following description, in which similar reference characters refer to similar parts, and in which:

DETAILED DESCRIPTION OF THE INVENTION

The present invention, configured either as a single free-standing pillar or as a variable aperture portal composed of two free-standing pillars, alarms only when a person carrying a ferromagnetic threat passes by the designated inside zone of the pillar, said designated zone defined by the motion-detection system, or the heat-sensing system (such as an infra-red sensor system) of the present invention. If a person carrying a ferromagnetic threat (or pushing a floor scrubber or other ferromagnetic threat) passes by the pillar's designated inside zone, the pillar's motion-detection system, or heat-sensing system, enables the sensor system to trigger an alarm. In the preferred embodiment, the alarms are both visual and auditory. Note again that a ferromagnetic threat passing by the non-designated outer aspect of the pillar can be, if large, sensed by the detection system of the pillar. No alarm is triggered, however, because the motion-detection system, or heat-sensing system, must register that a person with a ferromagnetic threat object is passing by the designated inside zone of the pillar, which has not occurred in this instance.

The pillar of the present invention is ideal for a mobile MRI truck or for a compact MRI center. When ferromagnetic motion (from elevators, cars, chairs, etc.) occurs outside the room housing the pillar, lack of activation of motion detection, or, alternatively, lack of activation of heat sensing, within the pillar's designated ferromagnetic threat detection zone prevents nuisance triggering of alarms caused by extraneous ferromagnetic motion occurring outside the designated detection zone. The present invention greatly decreases the possibility of a major ferromagnetic threat escaping identification and then entering the magnet room.

In the preferred embodiment of the present invention, be it a single pillar or a variable aperture portal, a connection to an automatic door interlock precludes entry to the magnet room when an alarm is triggered. The present invention functions as an excellent "last resort" ferromagnetic detection alarm, intended to prevent potential catastrophic accidents, such as when, for instance, pipe wrenches, floor polishers, wheelchairs, and even ferromagnetic gurneys enter the magnet room.

The present invention is intended to be "on" at all times, with the motion-detection, or heat-detection system, always ready to sense motion, or heat, respectively, thus enabling the sensor system to trigger the alarm (preferably both visual and auditory) if a ferromagnetic threat object is sensed passing by the pillar's designated inside ferromagnetic threat detection zone at any time night or day. Within the confines of an MRI mobile truck, or a small MRI center, when the pillar is placed close to the wall in order to screen the designated pass-by zone just before the magnet room is entered, it is quite difficult to circumvent the present invention, either intentionally or inadvertently.

Figure 1:
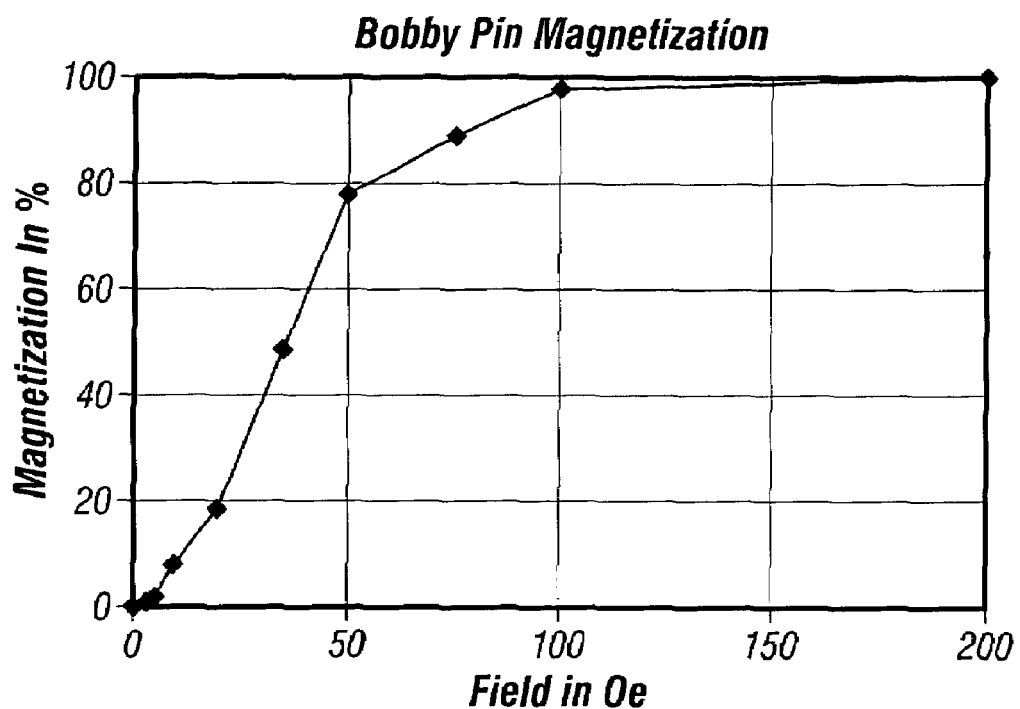
FIG. 1 is a graph illustrating the degree of magnetization of an object versus the magnitude of the applied magnetic field.

Existing ferromagnetic threat screening portals often depend upon the earth's magnetic field to magnetize target objects. Many common small ferromagnetic objects, such as bobby pins and paper clips, are scarcely magnetized by the small earth's field, roughly 0.5 Oe. FIG. 1 shows the magnetic moment induced in a bobby pin plotted versus a magnetic field applied parallel to the length of the pin. The bobby pin magnetization in the earth's 0.5 Oe field is only about 0.15% of saturation. The fringing field of the MRI magnet itself, typically 0.5 to 5 Oe, also yields poor induced magnetization, rendering detection quite difficult.

Detection of ferromagnetic threat objects is considerably facilitated if a moderate magnetic field of, say, 25 Oe is provided by magnetization means. A magnetic field of 25 Oe or so, giving a bobby pin magnetization of about 30%, increases the moment of the bobby pin target by a ratio of about 30% divided by 0.15%, or 200 times. Large threats are also better detected, especially at a distance from the sensors, if a magnetizing applied field is employed. As detectability is based, among other considerations, upon the level of induced magnetization of a threat object, applying an appropriately-sized independent magnetic field greatly increases detectability.

The strength of the magnetic field of a magnetized object is inversely proportional to the cube of the distance from the object. In other words, a factor of two increase in the distance results in a factor of eight decrease in the signal field. The ferromagnetic detection pillar of the present invention uses its own magnetization means because of this fact. The preferred embodiment uses permanent magnets, such as those composed of solid ferrite or flexible magnetic ferrite strips. Alternatively, coils may be utilized. The magnetic fields of the magnets on the pillar or pillars are oriented in the same direction, to make the largest distant magnetic field possible, thereby increasing detectability.

Figure 2:
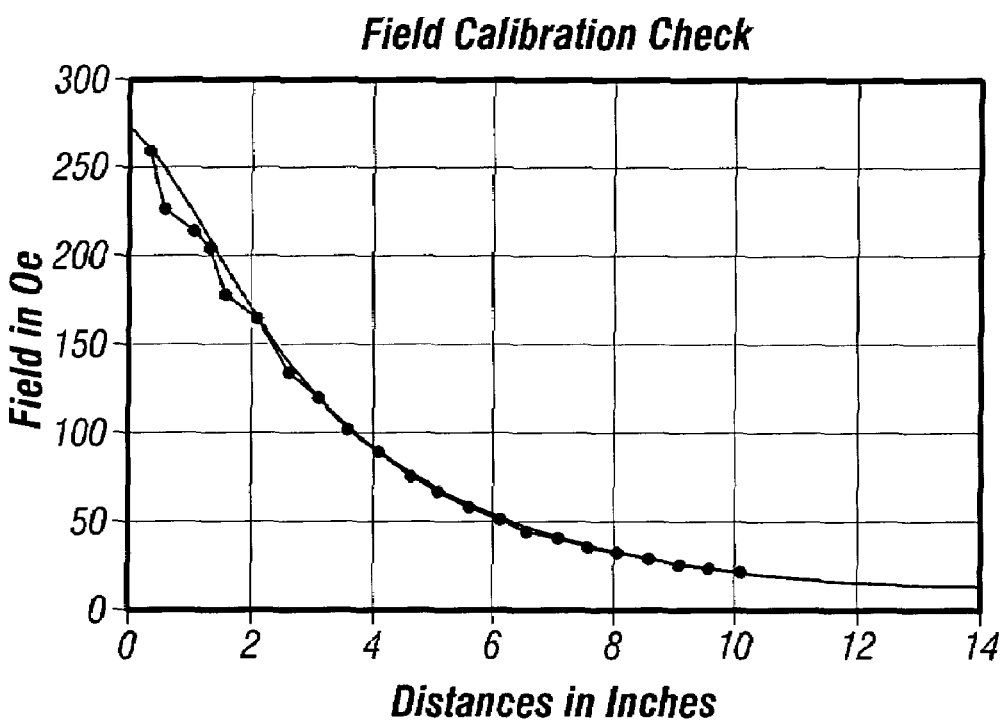
FIG. 2 is a graph which shows how the magnitude of the applied magnetic field varies with distance from the source.

FIG. 2 shows a calculated magnetic field plot for the pillar of the present invention, utilizing four inch by six inch magnets.

Figure 3:
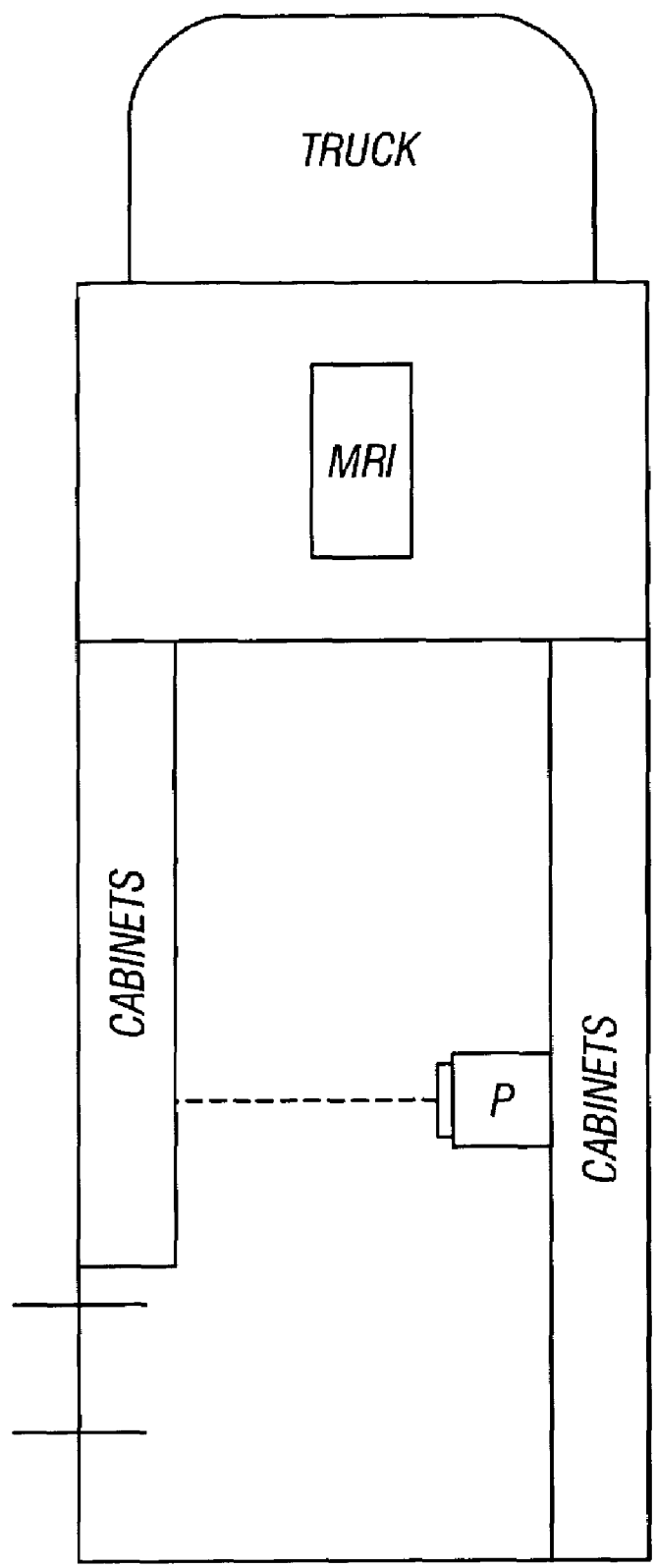
FIG. 3 is a schematic top plan of the pillar of the present invention within a mobile MRI truck.

FIG. 3 shows a top view perspective or the pillar of the present invention within a mobile MRI facility. In an effort to minimize alarms when not in use, many ferromagnetic detection portals alarm only when a "ready" switch is activated manually by the technician. The portal is "off" during other times. The pillar P of the present invention is "on" at all times, as is the motion-detection system, or, alternatively, the heat-sensing system. The pillar P of the present invention is adapted to alarm on only one side, activated by a motion-sensing detection system, or a heat-sensing system, such as an infra-red sensor system, while ignoring signals from the other side. A gradiometer sensor configuration facilitates the rejection of signals which could trigger false alarms secondary to ferromagnetic threats passing by the non-alarming side of the pillar, and, as well, appropriate software can be configured to assist spurious ferromagnetic noise rejection.

Figure 4:
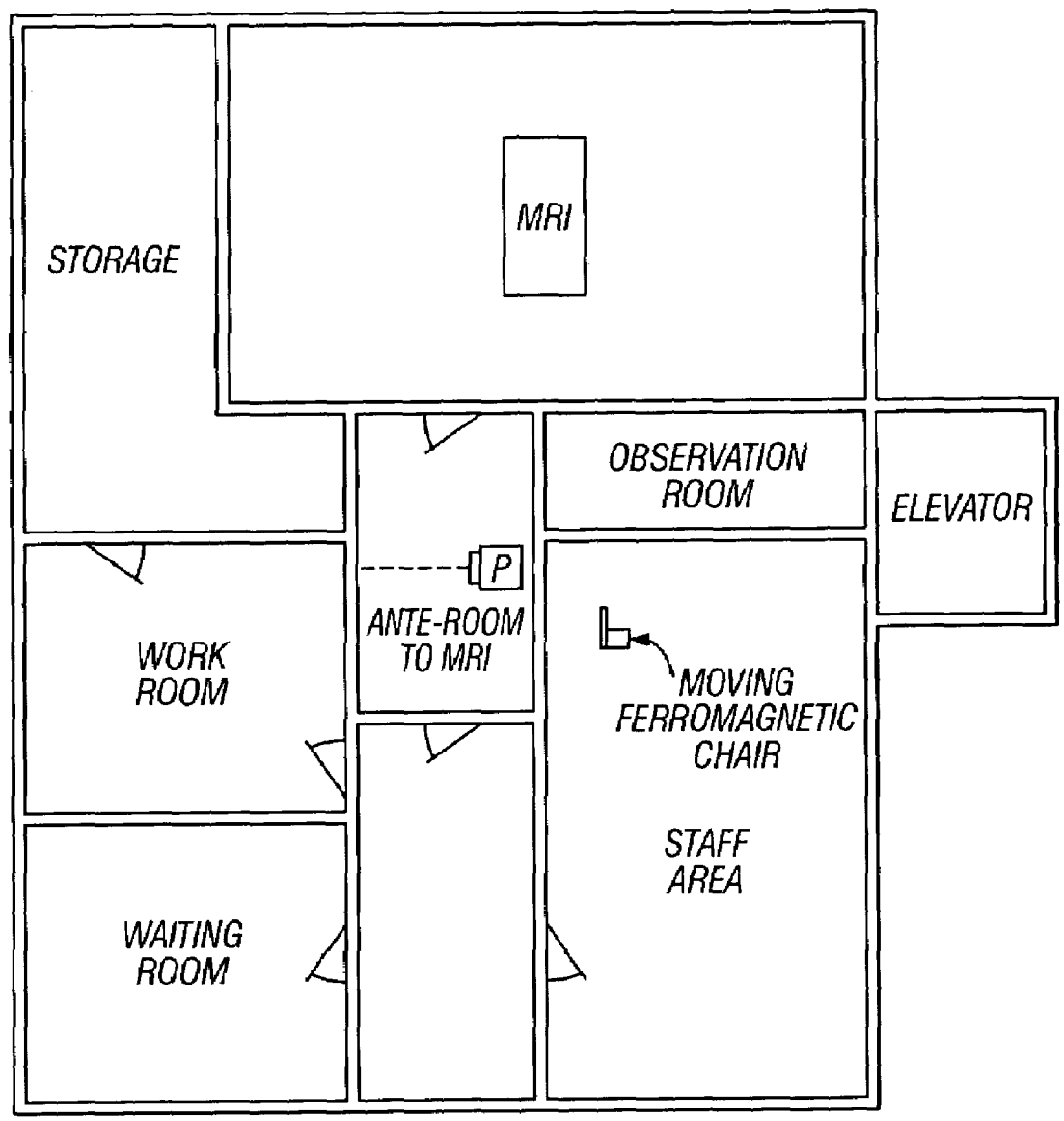
FIG. 4 is a schematic top plan of the pillar of the present invention within a compact MRI center.

FIG. 4 shows the top view of a compact MRI center, in this instance in close proximity to an elevator, as well as to a ferromagnetic chair which occasionally moves in the adjacent room. The motion-detection system, or heat-sensing system, of the pillar P of the present invention precludes threat alarms from the elevator and/or from the moving ferromagnetic chair, as the zone of threat alarm production is limited to the designated area, as shown by the dashed line, inside the room housing the pillar P, and the elevator and the moving chair are both outside this designated ferromagnetic threat detection zone. If a person carrying a ferromagnetic threat object passes by the dashed line area indicating the designated threat detection zone, however, the threat alarm is triggered.

Figure 5:
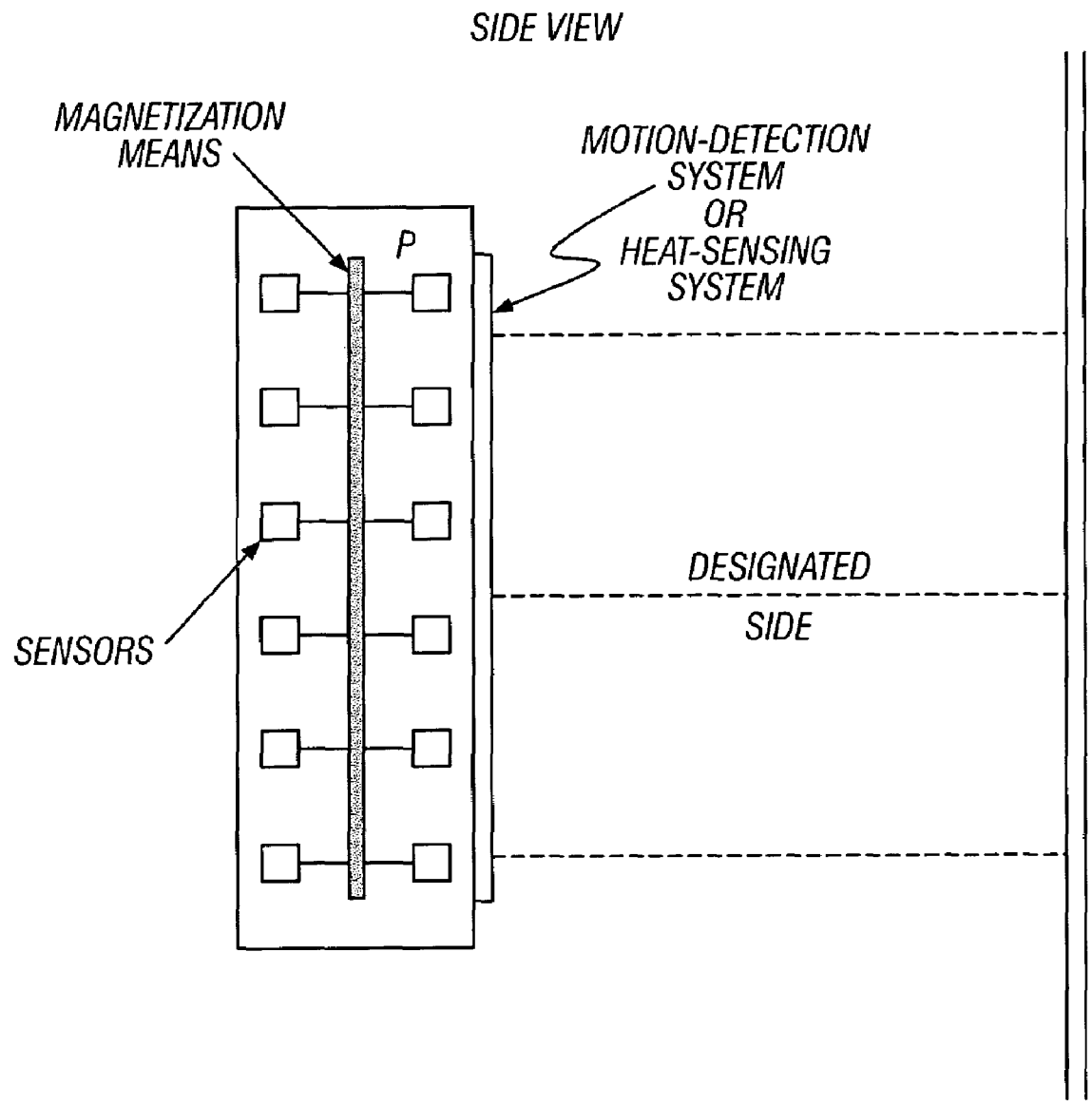
FIG. 5 is a schematic perspective of the pillar of the present invention, showing alarm triggering only on one side in the designated ferromagnetic threat detection zone.

FIG. 5 is a schematic perspective of the pillar P of the present invention, showing alarm triggering only on one side within the designated ferromagnetic threat detection zone. The opposite, non-designated, side is not in the line of potential activation of the motion-detection system, or the heat-sensing system, and, thus, ferromagnetic threat alarm production does not occur in this non-designated area, but, rather, is limited to the designated pass-by zone on the inside aspect of the pillar P. For alarm triggering, two events must always simultaneously occur:

1. Passage within the designated ferromagnetic detection zone must be detected by the motion-detection system, or, alternatively, by the heat-sensing system, of the present invention; and, 2. A ferromagnetic threat signal must be recognized by the sensor system, which has been enabled to trigger the alarm by event 1.

If these two events do not occur simultaneously, alarm triggering is absent.

Figure 6:
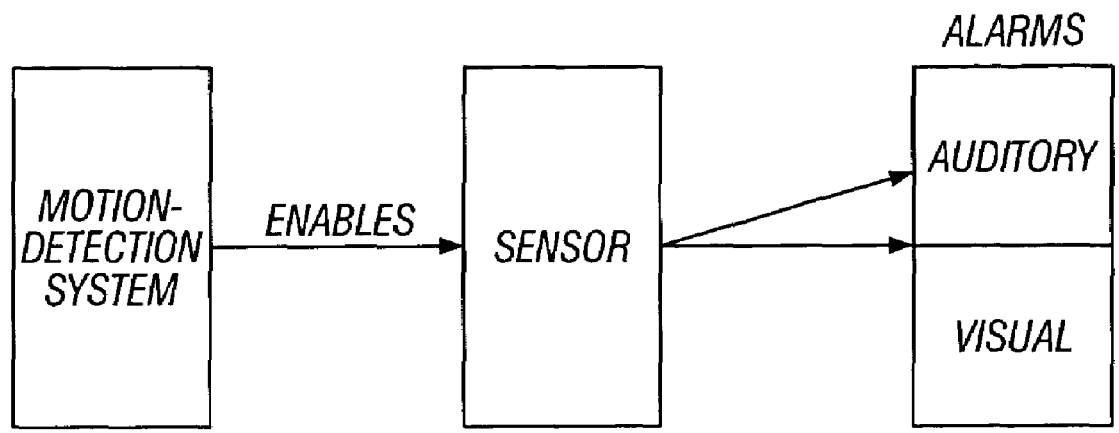
FIG. 6 diagrammatically depicts the present invention's preferred embodiments for sensing passage by the designated ferromagnetic threat zone, consisting of either a motion-detection system, or a heat-sensing system, such as an infra-red sensor system, which enables the sensor system of the present invention to trigger a ferromagnetic threat alarm.
Figure 6:
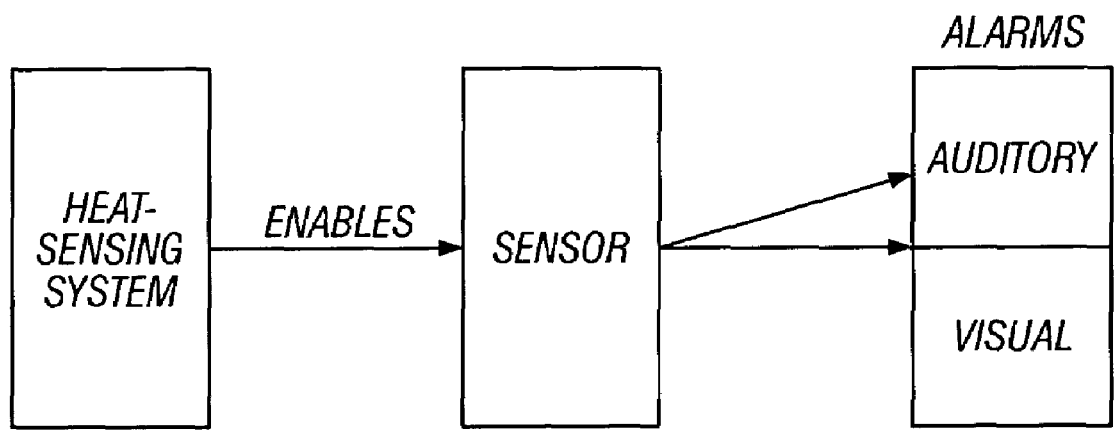

FIG. 6 diagrammatically depicts the present invention's preferred embodiments which enable the sensor system of the present invention to trigger a ferromagnetic threat alarm, consisting of either a motion-detection system, or a heat-sensing system, such as an infra-red sensor system. The threat alarm, preferably, has both auditory and visual components.

Figure 7A:
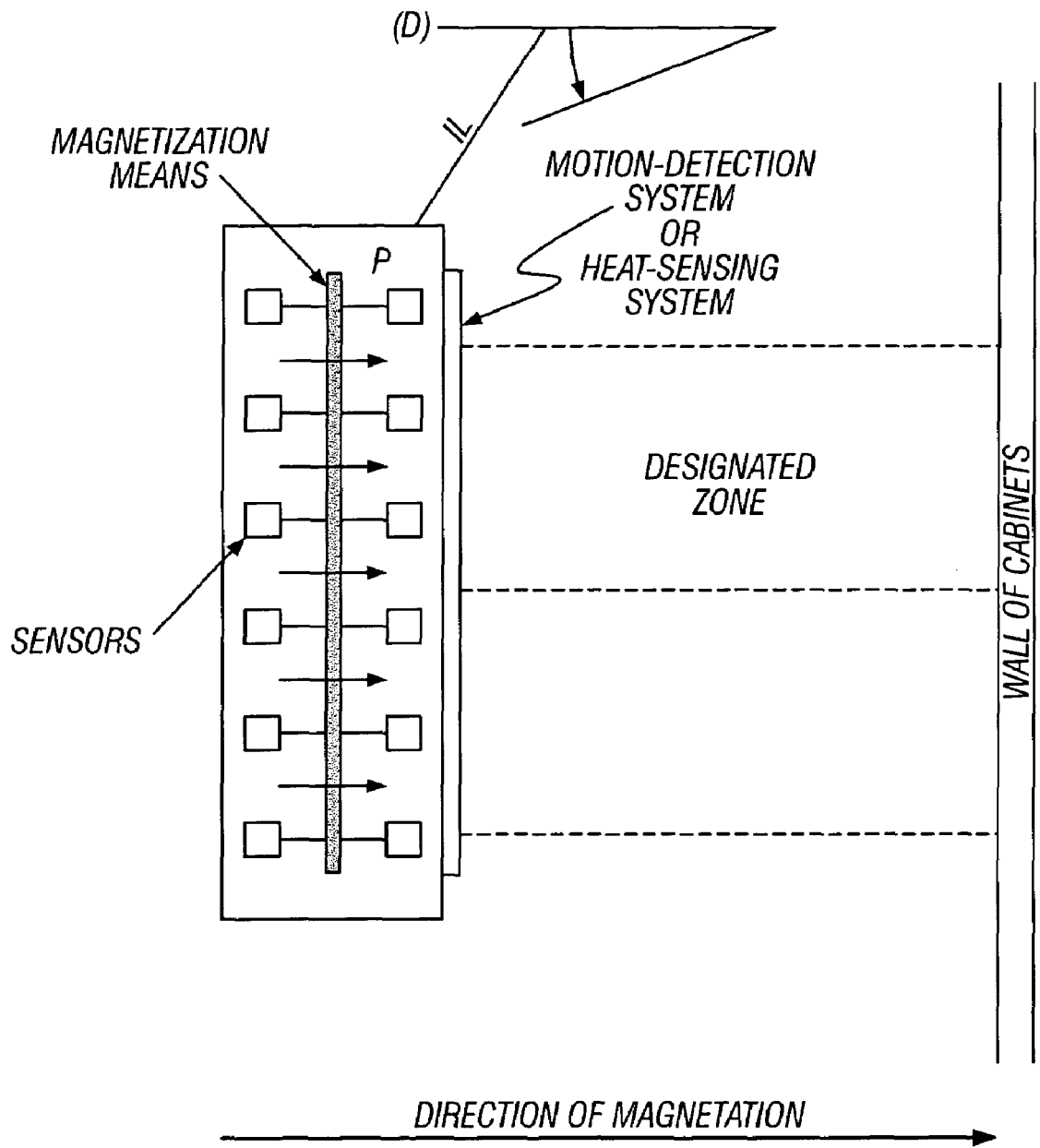
FIG. 7A shows the pillar P according to the present invention with the designated pass-by ferromagnetic threat detection zone, which is monitored by either a motion-detection system, or a heat-sensing system and the interlock to the magnet room door.

FIG. 7A shows the pillar P according to the present invention. Preferably, an interlock from the pillar P to the magnet room door D precludes a ferromagnetic threat object from entry into the magnet room. The dashed lines show the area of the designated pass-by ferromagnetic threat detection zone, which is monitored by either a motion-detection system, or a heat-sensing system. The magnet room door D is automatically locked when a ferromagnetic threat is detected in the designated pass-by zone.

Figure 7B:
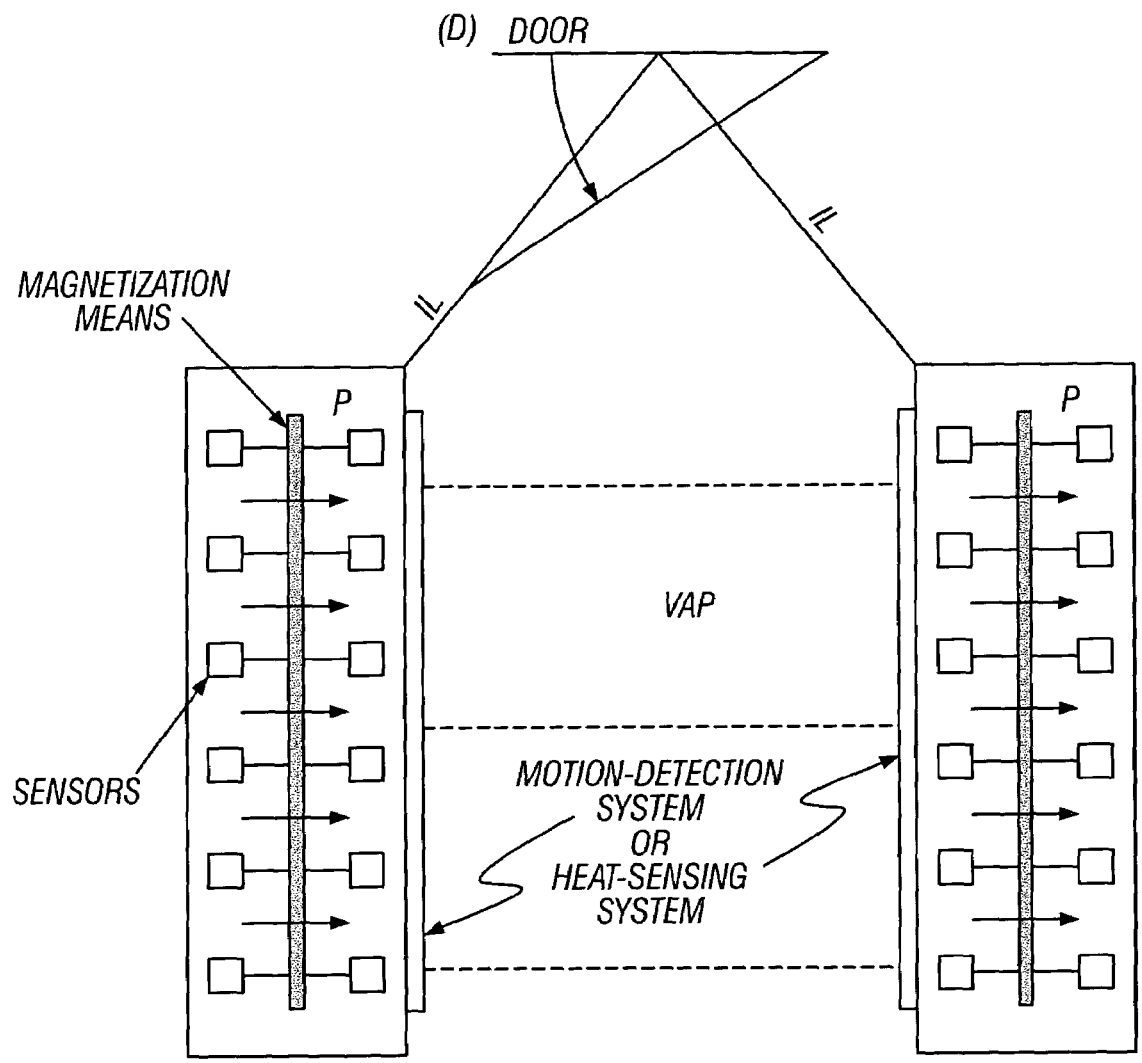
FIG. 7B shows two pillars P according to the present invention, forming a variable aperture portal.

FIG. 7B shows two pillars P according to the present invention, forming a variable aperture portal, labeled VAP. These free-standing pillars can be placed at the discretion of the MRI center managers, as there is no physical structure locking one pillar to the other. The width of the aperture can be varied easily because of lack of structure between the two pillars. Magnetization is in the same direction for each pillar P. The dashed lines show the area of the designated pass-by ferromagnetic threat detection zone, which is monitored by either a motion-detection system, or a heat-sensing system. An interlock IL from each pillar P to the door D entering the MRI room automatically locks the door when a ferromagnetic threat is detected in the designated zone.

Figure 8A:
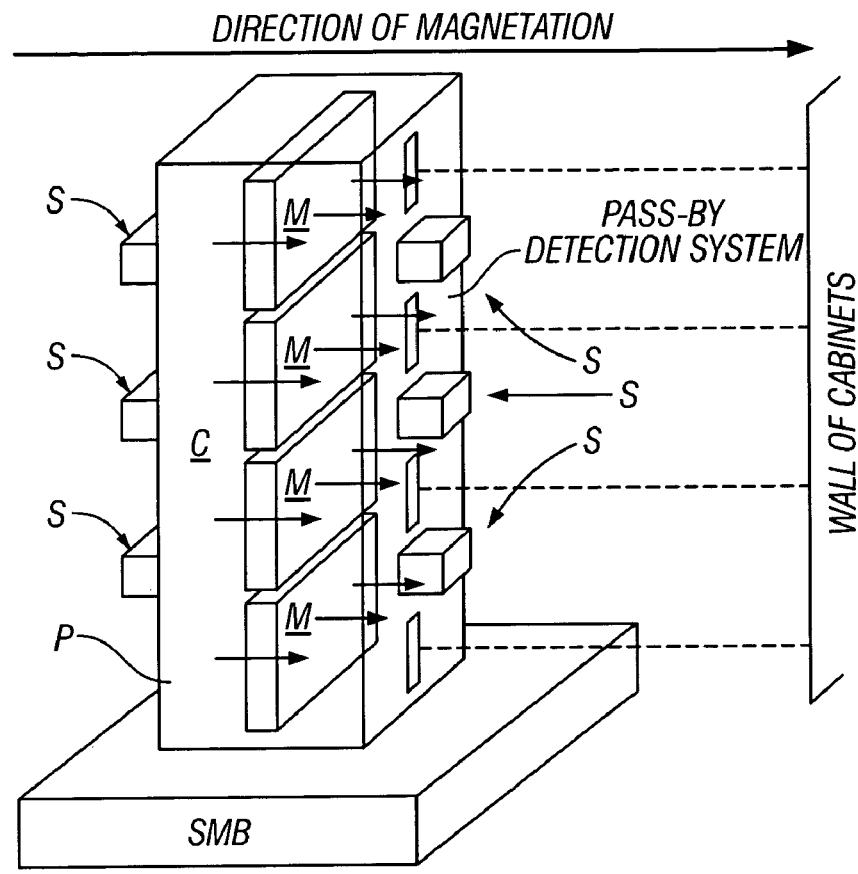
FIG. 8A is a schematic perspective view of the arrangement of magnets and sensors, and the motion-detection system, or heat-sensing system, such as an infra-red sensor system, on the pillar of the present invention.
Figure 8B:
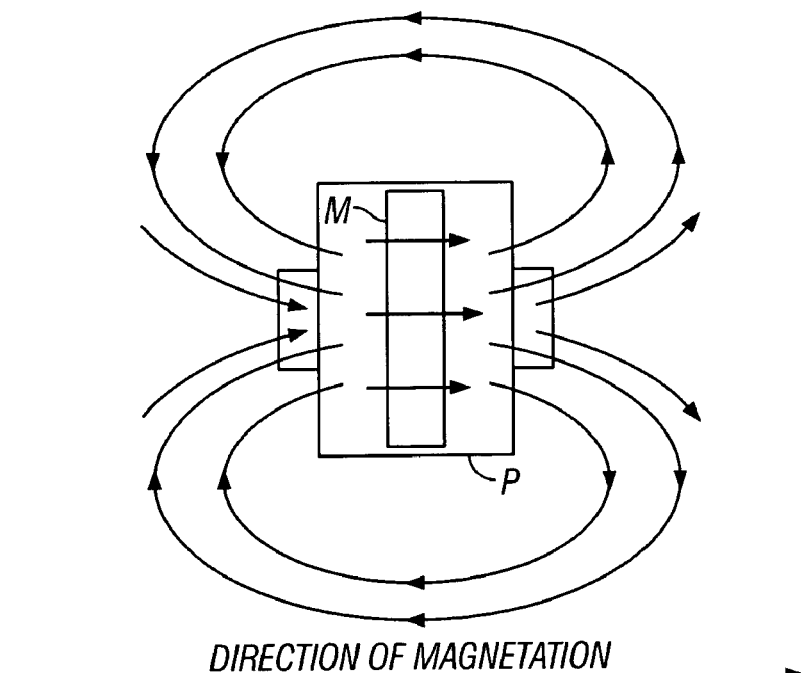
FIG. 8B is a schematic top plan view of the magnetic field generated by the pillar shown in FIG. 8A.

FIG. 8A shows the pillar P of the present invention, with a shock-mounted base SMB to minimize vibration, a column C extending to the desired height, such as 3 to 6 feet, a pass-by detection system, with the preferred embodiments being a motion-detection system, or a heat-sensing system (such as an infra-red sensor system), at least one magnetic-sensing sensor, or multiple-sensor magnetic-sensing configuration, S, and magnetizing means, preferably permanent magnets M. Another embodiment can be made much shorter, if the intent is simply to detect large ferromagnetic threat objects, such as floor scrubbers. In most MRI centers, however, a height limitation is not usually required. When two pillars P are used to configure a variable aperture portal, the applied field magnetization, indicated by the arrows, is oriented in the same direction for both pillars, as this achieves the largest distant magnetic field and thereby increases the detectability of a ferromagnetic threat object. If the applied fields of the two pillars were to be oriented in opposite directions, undesirable cancellation of the magnetic field in the center of the variable aperture portal would occur. FIG. 8B is a top view of one pillar P, showing representative magnetic field lines from the magnets M.

Figure 9A:
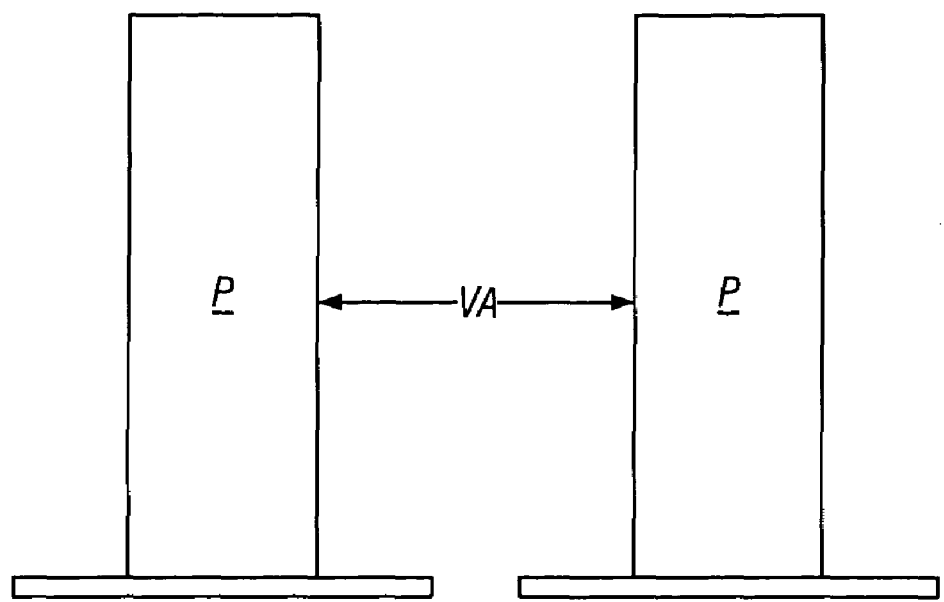
FIGS. 9A and 9B show two alternative spacing configurations of the pillar of the present invention.
Figure 9B:
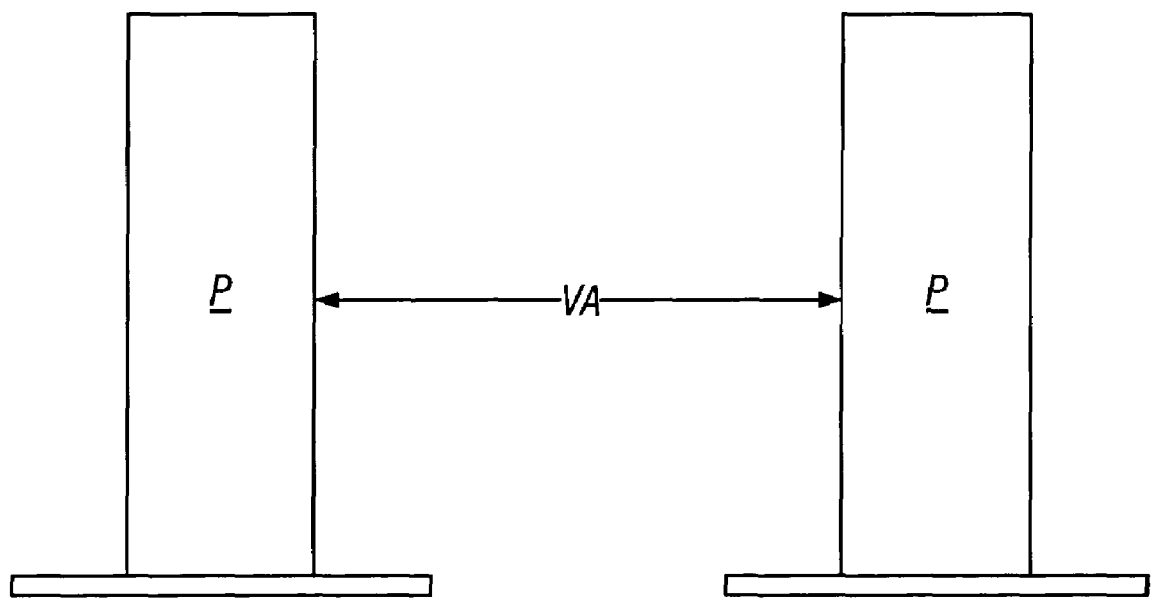

FIG. 9A and FIG. 9B show a variable aperture portal constituting two free-standing pillars P, demonstrating that the width of the variable aperture VA can be adjusted at will by the operator of the MRI center. If the variable aperture portal is moved, for instance, it can be configured with a different aperture than that employed in its original position.

Figure 10A:
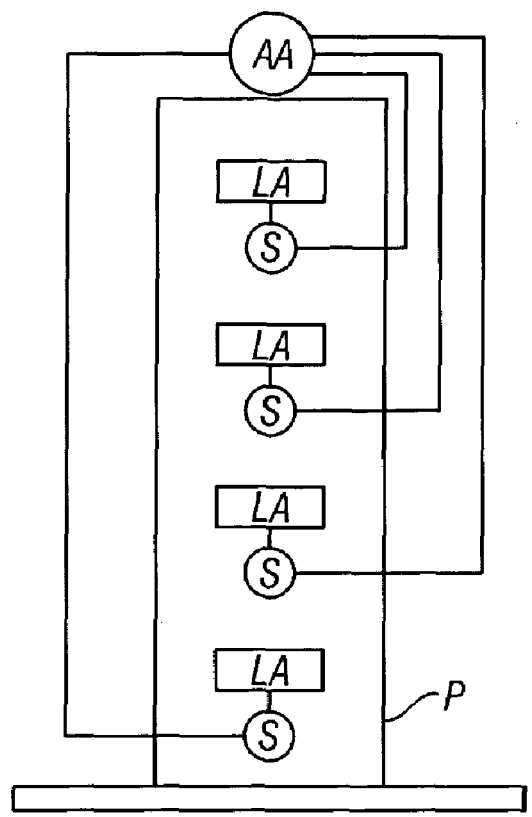
FIG. 10A is a schematic side elevation view of a pillar of the present invention with multiple sensor groups.
Figure 10B:
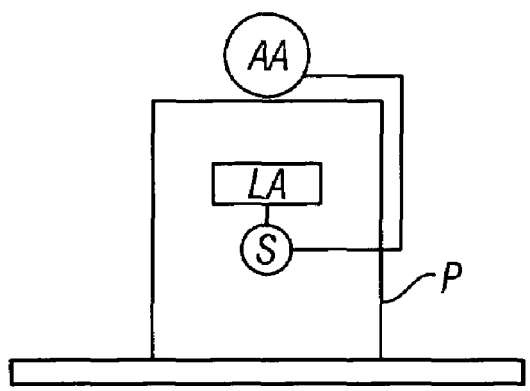
FIG. 10B is a schematic side elevation view of a pillar of the present invention with a single sensor group.

When more than one sensor or multiple-sensor configuration S is utilized for a pillar, location of the threat object can be achieved and displayed, via the use of appropriate software. As shown in FIGS. 10A and 10B, however, location of the threat object can be done less expensively, by having each sensor or multiple-sensor configuration S associated with that pillar P connected to its own independent light alarm system LA, with the light alarm system being located in close proximity to the associated sensor or multiple-sensor configuration. When a particular sensor or multiple-sensor configuration detects a threat object, the light alarm associated with that sensor or multiple-sensor configuration is triggered, giving an approximate height location for the ferromagnetic threat object. All sensors or multiple-sensor configurations on the pillar can be connected to a single auditory alarm AA, however, as dedicated auditory alarms are not needed.

The present invention employs independent magnetizing means to create an applied field. This is preferably via permanent magnets, such as those composed of solid ferrite or of magnetic ferrite strips. Alternatively, coils can be employed as a magnetization means. The sensors of each multiple-sensor configuration are preferably mounted in a gradiometer configuration about the magnetizing means, such that unwanted signals from distant noise sources tend to be rejected. In a gradiometer configuration, after appropriate balancing, each sensor "sees" the same magnetic field, and, if that field on both sensors is the same, a null reading occurs. This is desirable for maximal rejection of signals from distant sources, such as elevators, moving cars in the parking lot, and the like. On the other hand, in MRI centers which do not have extraneous sources of ferromagnetic material in the immediate environs (such as an MRI center lacking elevators, moving cars in the vicinity, etc.), the sensor preference can be one or more single sensors, as this increases detectability when compared to a gradiometer configuration. The use of single sensors is generally not appropriate for an MRI mobile truck which travels from place to place, however, as discussed herein. The gradiometer configuration will generally be employed, because most MRI centers, in reality, have the potential for significant moving ferromagnetic objects in the vicinity. Rejection of spurious and unwanted noise is important, as it is undesirable to detect ferromagnetic threats outside the room housing the pillar, as these constitute false alarms.

One sensor or multiple-sensor configuration per pillar can certainly suffice in the most basic embodiment of the present invention. In the preferred embodiment, however, 3 to 6 sensors or multiple-sensor configurations S are used, preferably in gradiometer configuration, and these are spaced appropriately apart and are mounted upon the vertical column of the pillar.

The sensors can be of the usual varieties, including, but not limited to, magneto-resistive, fluxgate, Hall sensors, ferrite rod sensors, a large induction coil, magneto impedance sensors, etc. The preferred sensor, however, is a saturation-resistant magneto-resistive sensor, since this sensor type has high sensitivity and a large dynamic range. This allows the sensor to be placed in close proximity to the applied field magnetizing source, preferably permanent magnets, and still retain high sensitivity. The described configuration of the preferred embodiment has the result that objects are sensed, and an alarm triggered, only when instructed to do so by the motion-detection system, or heat-detection system, aimed at the designated inner pass-through zone of the pillar.

As use of only the earth's magnetic field, or the MRI fringing field, for magnetization of the threat object is inadequate, the present invention utilizes its own magnetizing means. The preferred embodiment utilizes permanent magnets, such as those composed of solid ferrite or of flexible magnetic ferrite strips. Coils may alternatively be used. The permanent magnets preferably consist of four barium ferrite ceramic magnets, each 4 inches wide by 6 inches long by one inch thick. As shown in FIG. 2, such a magnet generates a magnetic field strength of about 90 Oe at 5 inches, 10 Oe at 15 inches, and 5 Oe at 20 inches. The 5 Oe field is 10 times higher than the earth's field of about 0.5 Oe. Clearly the distance at which a threat object can be detected depends on how much magnetic material the threat object contains. The larger the target, the farther away it can be sensed.

Because of the relatively large magnetic field in the pillar, detection sensors with a wide dynamic range and high sensitivity are desirable. Saturation-resistant magneto-resistive sensors are well suited for this application, and they are used in the preferred embodiments of the threat detection pillar and the variable aperture portal.

An array of several sensors or multiple-sensor configurations maximizes the chances that a small target object will be close enough to a sensor to be detected. In the case of the pillar of the present invention, the use of an array of sensors or multiple-sensor configurations is preferred, but, alternatively, in cases where only large targets, like floor scrubbers, are to be detected, a single sensor or multiple-sensor configuration located near the floor is all that is required. Likewise, in the most basic embodiment of the present invention, a single sensor or multiple-sensor configuration can be utilized for each of the pillars configuring the variable aperture portal.

The preferred embodiment is to employ 3 to 6 sensors or multiple-sensor configurations for each pillar, and employ the multiple-sensor configurations in a gradiometer sensor configuration. The preferred sensor is a saturation-resistant magneto-resistive sensor.

This disclosure is merely illustrative of the preferred embodiments of the invention and no limitations are intended other than as described in the appended claims.

We claim:

1. An apparatus for detecting a ferromagnetic threat object, comprising:
   a free-standing pillar;
   at least one applied magnetic field source mounted on said pillar;
   at least one magnetic sensor mounted on said pillar;
   a detection device adapted to detect the presence of an object in the vicinity of said pillar; and
   at least one protective device;
   wherein said at least one magnetic sensor is adapted to detect the magnetization of a ferromagnetic threat object by said magnetic field source; and
   wherein said detection device is adapted to enable said at least one magnetic sensor to activate said at least one protective device upon detection of the magnetization of a threat object, if and only if said detection device simultaneously detects an object with said magnetic sensor, while in the vicinity of said pillar.

2. The apparatus recited in claim 1, wherein:
   said detection device is adapted to detect the presence of a threat object on a selected side of said pillar; and
   said detection device is adapted to enable said at least one sensor to activate said at least one protective device upon detection of the magnetization of a threat object, if and only if said detection device simultaneously detects an object on said selected side of said pillar.

3. The apparatus recited in claim 1, wherein said detection device comprises a motion detection system.

4. The apparatus recited in claim 1, wherein said detection device comprises a heat detection system.

5. The apparatus recited in claim 4, wherein said heat detection device comprises an infrared sensor system.

6. The apparatus recited in claim 1, wherein said at least one magnetic sensor comprises a saturation-resistant magnetoresistive sensor.

7. The apparatus recited in claim 1, wherein said at least one protective device comprises a door interlock.

8. The apparatus recited in claim 1, wherein said at least one protective device comprises an alarm.

9. The apparatus recited in claim 1, further comprising a plurality of said free-standing pillars, said pillars being spaced apart to establish at least one aperture therebetween for passage of a potential threat object.

10. The apparatus recited in claim 9, wherein said at least one detection device is adapted to detect only the presence of an object within said at least one aperture.

11. A method for detecting a ferromagnetic threat object, comprising:
    providing a free-standing pillar having at least one applied magnetic field source and at least one magnetic sensor;
    providing at least one detection device and at least one protective device;
    detecting the magnetization of a ferromagnetic threat object by said magnetic field source, with said magnetic sensor; and
    activating said at least one protective device upon detection of a threat object by said magnetic sensor, if and only if said at least one detection device simultaneously detects the presence of an object with said magnetic sensor, while in the vicinity of said pillar.

12. The method recited in claim 11, further comprising:
    detecting any object which may be present on a selected side of said pillar with said at least one detection device; and
    activating said at least one protective device upon detection of a threat object by said magnetic sensor, if and only if said at least one detection device simultaneously detects the presence of an object on said selected side of said pillar.

13. The method recited in claim 11, further comprising;
    providing a plurality of said free-standing pillars;
    spacing said pillars apart to establish at least one aperture therebetween for passage of a potential threat object;
    detecting the presence of an object passing through said aperture, with said detection device; and
    detecting the magnetization of a ferromagnetic threat object, with said sensor.

* * * * *